United States Patent
Wu (10) Patent No.: US 8,270,294 B2
(45) Date of Patent: Sep. 18, 2012

(54) METHOD AND APPARATUS FOR IMPLEMENTING MULTICAST SERVICE

(75) Inventor: Haijun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 11/940,781

(22) Filed: Nov. 15, 2007

(65) Prior Publication Data

US 2008/0068990 A1 Mar. 20, 2008

Related U.S. Application Data

(63) Continuation of application No. PCT/CN2006/001774, filed on Jul. 20, 2006.

(30) Foreign Application Priority Data

Jul. 22, 2005 (CN) .......................... 2005 1 0085514

(51) Int. Cl.
*H04L 12/26* (2006.01)
*H04L 12/16* (2006.01)

(52) U.S. Cl. ......... 370/229; 370/242; 370/252; 370/260
(58) Field of Classification Search .................. None
See application file for complete search history.

(56) References Cited

U.S. PATENT DOCUMENTS

| | | | | |
|---|---|---|---|---|
| 6,144,661 A * | 11/2000 | Katsube et al. | ............... | 370/390 |
| 6,233,618 B1 * | 5/2001 | Shannon | ....................... | 709/229 |
| 6,771,673 B1 * | 8/2004 | Baum et al. | .................... | 370/535 |
| 7,228,356 B2 | 6/2007 | Nguyen et al. | | |
| 2002/0073062 A1 * | 6/2002 | Cerami et al. | ..................... | 707/1 |
| 2002/0073364 A1 * | 6/2002 | Katagiri et al. | ................. | 714/48 |
| 2002/0097728 A1 | 7/2002 | Hinderks et al. | | |
| 2003/0145102 A1 * | 7/2003 | Keller-Tuberg | ............... | 709/237 |
| 2004/0076162 A1 | 4/2004 | Lee et al. | | |

FOREIGN PATENT DOCUMENTS

| | | |
|---|---|---|
| CN | 1395388 A | 2/2003 |
| EP | 1 429 489 A2 | 6/2004 |

OTHER PUBLICATIONS

European Patent Office, First Examination Report in European Patent Application No. 06761509.6 (Dec. 18, 2009).

(Continued)

*Primary Examiner* — Gregory Sefcheck
*Assistant Examiner* — Steve Young
(74) *Attorney, Agent, or Firm* — Leydig, Voit & Mayer, Ltd.

(57) ABSTRACT

Embodiments of the present invention provide a method and an apparatus for implementing a multicast service. The method includes: constructing a multicast service notification packet, and sending the multicast service notification packet to a user terminal; the multicast service notification packet may be a return notification packet for responding a request of a user for joining a multicast group or an abnormity notification packet for notifying a user of reason for an abnormity in the multicast service or the reason that the user fails to join the multicast group. Therefore, it is effective to improve the user's satisfaction of a multicast video service provided by an operator and to improve the operability and the manageability of a multicast video network.

18 Claims, 4 Drawing Sheets

OTHER PUBLICATIONS

State Intellectual Property Office of the People's Republic of China, Written Opinion of the International Searching Authority in International Patent Application No. PCT/CN2006/001774 (Oct. 18, 2006).

State Intellectual Property Office of the People's Republic of China, First Examination Report in Chinese Patent Application No. 200680012193.6 (Aug. 23, 2009).

$3^{rd}$ Office Action in corresponding European Application No. 06761509.6 (Feb. 1, 2011).

$2^{nd}$ Office Action in corresponding Chinese Application No. 200510085514.2 (Jan. 29, 2010).

$3^{rd}$ Office Action in corresponding Chinese Application No. 200510085514.2 (Apr. 21, 2011).

International Search Report in corresponding PCT Application No. PCT/CN2006/001774 (Nov. 18, 2006).

4th Office Action in corresponding Chinese Application No. 200510085514.2 (Jul. 21, 2011).

* cited by examiner

METHOD AND APPARATUS FOR IMPLEMENTING MULTICAST SERVICE

This application is a continuation of International Patent Application No. PCT/CN2006/001774, filed Jul. 20, 2006, which claims priority to Chinese Patent Application No. 200510085514.2, filed Jul. 22, 2005, both of which are hereby incorporated by reference.

FIELD OF THE INVENTION

The present invention relates to network communication technologies, more particularly, to a method and an apparatus for implementing a multicast service.

BACKGROUND OF THE INVENTION

At present, a multicast service is provided on a networking model generally over a multicast video network including a video headend system (i.e. headend system), an IP Metropolitan Area Network (MAN) (i.e. core device), an access network (edge device), and a home network.

The video headend system implements functions such as video subscriber management, Condition Access (CA)/Digital Rights Management (DRM), video coding, and transmits a video stream to an IP MAN. Signals of a TV and a broadcast channel are encoded into one-path stream by means of the MPEG-2 and the one-path stream is encapsulated in a User Datagram Protocol (UDP)/IP packet. The IP MAN transmits a video stream to a broadband access network by means of an IP multicast function. The access network implements the process of joining and leaving a video group, and sends the video stream required to the user.

The access network may include a Layer 2 switch and a Digital Subscriber Line Access Multiplexer (DSLAM). The Layer 2 switch includes an Asynchronous Transfer Mode (ATM) switch or an Ethernet switch. The access network connects with users via physical lines such as a Fast Ethernet (FE) or an x Digital Subscriber Line (xDSL). The IP MAN sends a video stream to an edge device to which a user connects, such as a multicast router, a Layer 2 switch or a DSLAM, and the video stream is sent to users according to an Internet Group Management Protocol (IGMP) control packet.

At present, a PC or a Set Top Box (STB) joins the multicast programs as a user device through a multicast protocol, IGMP (V1, V2 or V3). The IGMP is a protocol over an IP protocol and in parallel with the IP protocol, and defines two entities, a client and a multicast router. The two entities are a video terminal and an access device with respect to the above network.

Based on an IGMP protocol, a host is able to report that the host wants to join or leave a multicast group to a multicast router. For example, when joining the multicast group, a host sends a "membership report" message to a local multicast router, and makes an appropriate preparation of its own IP module so as to receive data transmitted from the multicast group.

Before developing a multicast service, it is necessary to configure different port-based multicast rights at a DSLAM. A user is able to access multicast contents listed in a multicast right list of the user. When accessing other contents, the user will be rejected without any content to be returned.

In a DSL-based Internet Protocol Television (IPTV), since DSL line bandwidth changes randomly, the bandwidth reduction or off-line will occur when a DSL line is affected by instantaneous external interference. In accordance with the dynamic multicast bandwidth control, a random packet loss will occur in the videos of all programs when the bandwidth requirement for a DSL line has exceeded the downlink bandwidth of the DSL line, thereby influencing the program that a user is watching.

At present, in the procedure of developing a multicast service by a user terminal, there is no IGMP-based feedback channel in a server end since the current IGMP protocol only supports a unidirectional process initiated by a user.

In this way, the network side only simply rejects a request from a user or randomly discards a multicast packet sent to a video terminal of the user under an abnormal condition, and thus there will be a blank screen in the video terminal of the user. That is to say, it is impossible for the network side to notify a user of a reason that the user is unable to watch a video program or the quality of the video program watched by the user is impaired, thereby influencing the user's satisfaction of a multicast video service.

SUMMARY OF THE INVENTION

The present invention provides a method and an apparatus for implementing a multicast service, which makes it possible for a user terminal to explicitly obtain the condition for joining a multicast group and developing the multicast service in the process of joining the multicast group, thereby improving the operability of developing the multicast service.

The present invention is implemented with the following technical solutions.

A method for implementing a multicast service includes:
receiving a packet from a user terminal;
constructing, by a network side providing a multicast service, a multicast service notification packet upon receiving the packet from the user terminal; and
sending the multicast service notification packet to the user terminal.

The multicast service notification packet is an abnormity notification packet; and
the constructing the multicast service notification packet includes:
determining a reason that the network side is unable to provide the user terminal with the multicast service; and
carrying the reason in the abnormity notification packet.

The determining the reason that the network side is unable to provide the user terminal with the multicast service includes:
determining a reason that the user terminal is unable to join a multicast group, when the user terminal applies to the network side for joining the multicast group and the user terminal is unable to join the multicast group.

The reason that the user terminal is unable to join the multicast group is selected from the group consisting of:
a reason that the user terminal has no right to join the multicast group; and
a reason that a physical port of the network side does not have enough bandwidth to enable the user terminal to develop the multicast service.

The determining the reason the network side is unable to provide the user terminal with the multicast service includes:
determining a reason that quality of service (QoS) of the multicast service is changed, when the QoS of the multicast service obtained by the user terminal having joined the multicast group is changed.

The multicast service notification packet is a return notification packet; and the constructing the multicast service notification packet includes:

constructing the return notification packet upon receiving a packet for joining the multicast group sent by the user terminal.

The constructing the multicast service notification packet includes:

extracting a source address from a packet for joining a multicast group sent by the user terminal upon receiving the packet for joining the multicast group sent by the user terminal; and modifying a destination address of the multicast service notification packet into the source address extracted from the packet in the multicast service notification packet.

The source address includes:

a Media Access Control (MAC) address of the user terminal.

The constructing the multicast service notification packet includes:

recording a port of the user terminal upon receiving a packet for joining a multicast group sent by the user terminal;

carrying the multicast service notification packet using a multicast packet; and the sending the multicast service notification packet to the user terminal includes:

transmitting the multicast service notification packet to the recorded port of the user terminal.

The multicast service notification packet is selected from the group consisting of: a return notification packet and an abnormity notification packet.

The return notification packet and the abnormity notification packet are obtained by extending one type of Internet Group Management Protocol (IGMP) packet.

The return notification packet and the abnormity notification packet are obtained by extending two types of IGMP packets, respectively.

An apparatus for implementing a multicast service includes:

means, for receiving a packet from a user terminal;

a multicast service notification packet constructing module, for constructing a multicast service notification packet upon receiving the packet from the user terminal, and sending the multicast service notification packet to the user terminal.

The multicast service notification packet constructing module includes:

a return notification packet constructing module, for constructing a return notification packet upon receiving a packet for joining a multicast group sent by the user terminal, and sending the return notification packet as the multicast service notification packet to the user terminal.

The multicast service notification packet constructing module further includes:

an abnormity notification packet constructing module, for constructing an abnormity notification packet, and sending the abnormity notification packet as the multicast service notification packet to the user terminal.

The multicast service notification packet constructing module further includes:

an abnormity reason determining module, for determining a reason for an abnormity when the abnormity occurs in the multicast service provided for the user terminal; and the abnormity notification packet constructing module constructs the abnormity notification packet according to the reason determined by the abnormity reason determining module.

A user terminal for implementing a multicast service includes:

means, for sending a packet from a user terminal;

a multicast service request sending control module, for controlling resending the packet if receiving no multicast service notification packet returned by a network side upon sending the packet to the network side.

The user terminal further includes:

an abnormity notification packet handling module, for receiving an abnormity notification packet sent by the network side, and displaying on a display interface a reason for an abnormity contained in the abnormity notification packet.

As can be seen from the above technical solution in accordance with the embodiments of the present invention, the network side returns a response packet (i.e. multicast service notification packet) to a user terminal after receiving a packet for the joining the multicast group by the user terminal in accordance with the embodiments of the present invention, which makes it possible for the user terminal to obtain in time whether the joining process is successful and the reason for failing to join the multicast group, and may obtain the relevant reasons when the quality of multicast videos watched by a user is impaired. Therefore, it is effective to improve the user's satisfaction of a multicast video service provided by an operator.

The method in accordance with the embodiments of the present invention specifically provides a return notification and a notification function by extending an IGMP, so as to improve the stability of a multicast protocol and improve the operability and the manageability of a multicast video network.

EMBODIMENTS OF THE INVENTION

In accordance with embodiments of the present invention, the network side providing a multicast service can provide information in the process of developing the multicast service for a user terminal (i.e. user device, or referred to as user terminal device). The network side providing the multicast service constructs a multicast service notification packet according to the condition that the user terminal applies for and develops the multicast service, and sends the multicast service notification packet to the user terminal. The multicast service notification packet may be: a return notification packet for responding to a request from a user terminal for joining the multicast group, and/or, an abnormal notification packet for notifying a user terminal of a reason that the multicast service is abnormal or a reason that the user terminal is failed to join the multicast group.

In the case that network resources or user rights are unable to meet the requirement of a user for a multicast video service, it is possible to switch to a video channel for explaining a reason to the user or switch to a free and independent video channel, and send a multicast service notification packet to the user terminal, so as to avoid that a blank screen occurs while the user is unable to learn a reason for the blank screen, thereby improving the user's satisfaction. The case that the network resources or the user rights are unable to meet the requirement of the user for the multicast video service includes that: a joining condition is unable to be met in the process of joining a multicast group by a user terminal, and the quality of the multicast video service is impaired and the multicast video service is unable to be received in the process of receiving the multicast video service by the user terminal.

Figure 1:
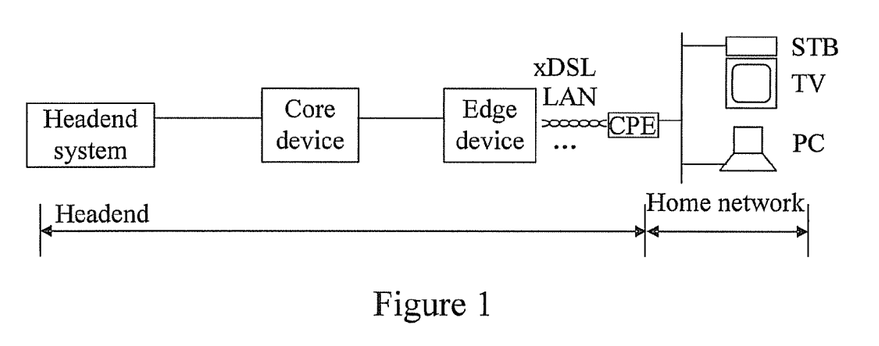
FIG. 1 is a schematic diagram illustrating a networking model of a multicast network.

A multicast service is provided on a networking model generally as shown in FIG. 1. A multicast video network as shown in FIG. 1 includes: a video headend system (i.e. headend system), an MAN (i.e. core device), an access network (edge device), and a home network.

Figure 2:
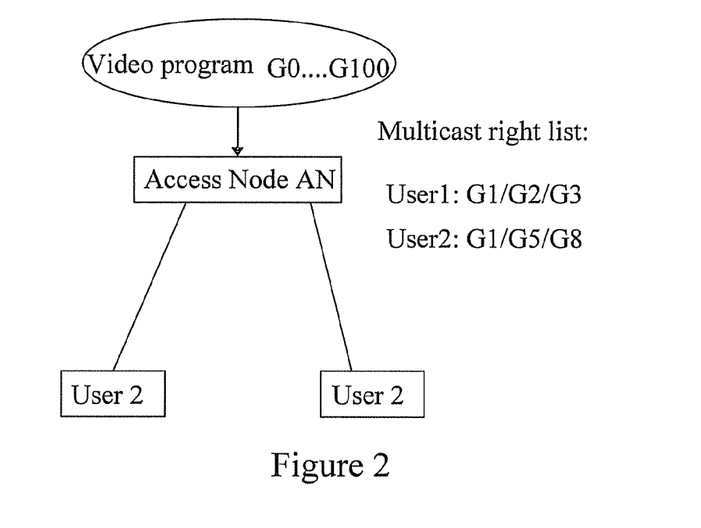
FIG. 2 is a schematic diagram illustrating the structure of a multicast network.

As shown in FIG. 2, multicast rights of User 1 and User 2 are configured in a multicast right list stored in an Access Node (AN). The AN controls the right of a user to watch a video service according to the information listed in the multicast right list.

Figure 3:
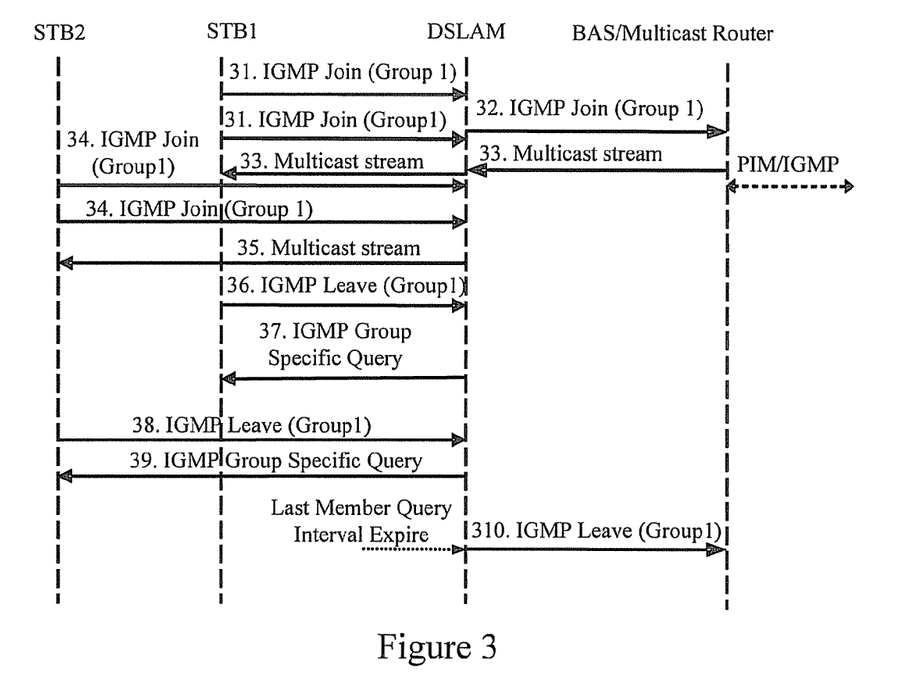
FIG. 3 is a schematic diagram illustrating the procedure of developing a multicast service.

The procedure of developing a multicast video service by a user in FIG. 2 may be implemented as shown in FIG. 3, specifically including the following processes.

31: When User 1 chooses to watch a program on Channel 1, a user device, i.e. STB 1, sends an IGMP Join packet for joining multicast group 1, i.e. Group 1.

To avoid an abnormity caused by the loss of a packet, it is usually needed to send the IGMP Join packet two times.

32: After receiving the IGMP Join packet from User 1, a DSLAM, as an IGMP Proxy, checks whether User 1 has a right to join Group 1, or whether the physical port has enough bandwidth; if the physical port has enough bandwidth, the DSLAM detects whether a members has joined Group 1; if User 1 is the first member of Group 1, the DSLAM sends an IGMP Join packet to an upper layer multicast router to join Group 1.

33: After receiving the IGMP Join packet from the DSLAM, the upper layer multicast router sends a multicast stream of Group 1 to the DSLAM; and after receiving the multicast stream, the DSLAM multicasts the multicast stream to the port of User 1 (Supporting across-VLAN/PVC multicast forwarding).

The multicast router may need to exchange multicast routing information with an upper layer device through a Protocol-Independent Multicast (PIM)/IGMP.

34: When User 2 also chooses to watch a program on Channel 1, another user device, i.e. STB 2, sends an IGMP Join packet for joining Group 1.

35: After receiving the IGMP Join packet from the User 2, the DSLAM finds that there is a member joining Group 1, and sends multicast stream 1 to User 2.

36: When User 1 changes channels or stops watching the program on Channel 1, STB 1 sends an IGMP Leave packet for leaving Group 1.

37: After receiving the IGMP Leave packet from STB1, the DSLAM sends an IGMP Group Specific Query packet to determine whether there is another STB watching Channel 1 via the port; if there is not another STB watching Channel 1 via the port, stops sending multicast stream 1 to the port; if an IGMP Quick Leave manner is adopted, the DSLAM directly stops forwarding multicast stream 1 to the port instead of sending the IGMP Group Specific Query packet.

38: When User 2 changes channels or stops watching the program on Channel 1, STB2 sends an IGMP Leave packet for leaving Group 1.

39: After receiving the IGMP Leave packet, the DSLAM sends an IGMP Group Specific Query packet to determine whether there is another STB watching Channel 1 via the port; if there is not another STB watching Channel 1 via the port, stops sending multicast stream 1 to the port; if the IGMP Quick Leave manner is adopted, the DSLAM directly stops forwarding multicast stream 1 to the port instead of sending the IGMP Group Specific Query packet.

310: If the DSLAM does not receive a Report message after a Last Member Query Interval expires, the DSLAM determines that Group 1 has not a member, and sends an IGMP Leave packet to the upper layer multicast router.

Figure 4:
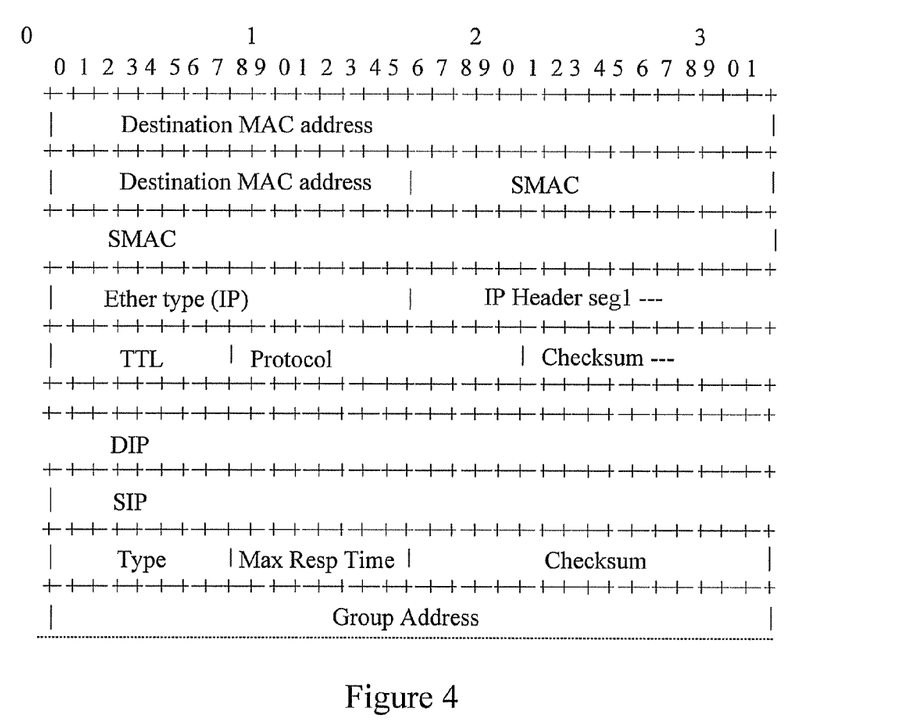
FIG. 4 is a schematic diagram illustrating the format of an existing IGMP packet.

To describe the present invention conveniently, the format of an IGMP packet over an Ethernet interface in the process of developing a multicast service by a user is firstly described hereinafter in accordance with IGMP V2 RFC2236 standard, and the format of the IGMP packet is as shown in FIG. 4. The IGMP packet includes the following.

First, an Ethernet header, in which a source MAC address is a unicast MAC address, a destination MAC address is a multicast MAC address, and an Ethernet protocol type, Ethertype, is IP, indicating that the IGMP packet is an IP packet.

Second, an IP header, in which a source IP address is a unicast IP address of a transmitter, a destination IP address is a multicast IP address which is mapped into the multicast MAC address of the Ethernet header by means of a general rule; for the IGMP, the protocol type in the IP header is IGMP, indicating that the data carried is IGMP data.

Third, an IGMP header, when an IGMP packet is defined according to IGMP v2 standard, including: a Type indicating the type of the IGMP packet as follows:

0x11=Membership Query, group query packet;

0x16=Version 2 Membership Report, group report packet, for joining a multicast group;

0x17=Leave Group, group leave packet, for leaving a designated multicast group;

0x12=Version 1 Membership Report, compatible with a packet type of IGMP V1;

a maximal response time; and a check value Checksum for checking the integrity of a packet.

Finally, a multicast group number.

The present invention may be implemented by extending the existing IGMP and a procedure described as follows. Two aspects are considered in the embodiment of the present invention.

After receiving an IGMP packet, a device issues a return notification packet to improve the reliability of the IGMP packet, thereby reducing the times of sending an IGMP packet blindly.

Moreover, it is necessary for extending the IGMP to add a packet type for sending an abnormity reason to a user terminal when an on-demand request of the user terminal fails; if there is no enough bandwidth for the requirement of the user terminal, it is necessary to send an IGMP multicast notification packet to the user terminal.

Figure 5:
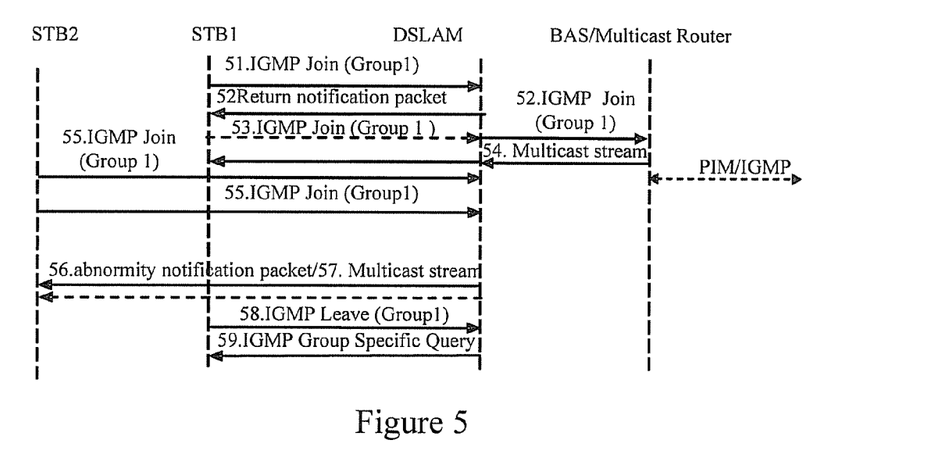
FIG. 5 is a schematic diagram illustrating the procedure of developing a multicast service in accordance with an embodiment of the present invention.

At first, the procedure, modified by the present invention, of joining a multicast group to develop a multicast service by a user terminal, is described as follows. As shown in FIG. 5, the procedure specifically includes the following processes.

51: When User 1 chooses to watch a program on Channel 1, STB 1 sends an IGMP Join packet for joining multicast group 1, and starts Timer 1 set for 2S.

52: After receiving the IGMP join packet from User 1, the DSLAM acting as an IGMP Proxy records a source MAC address of STB1, and constructs an IGMP packet according to the source MAC address in the IGMP join packet; the IGMP packet, as a return notification packet, i.e. as a multicast service notification packet, is sent to STB1 by means of a unicast Ethernet packet and by taking the source MAC address of STB 1 as the destination MAC address; alternatively, using IGMP multicast encapsulation, the DSLAM sends the return notification packet to the corresponding user terminal via a port to which an IGMP Join packet connects.

The DSLAM further needs to check whether the user has a right to join multicast group 1 or the physical port has enough bandwidth; if has enough bandwidth, the DSLAM determines whether a member has joined multicast group 1; if the user is the first member of multicast group 1, the DSLAM sends an IGMP Join packet to an upper layer multicast router to join multicast group 1.

53: After receiving the return notification packet, STB1 does not send a backup IGMP Join packet if STB 1 determines that the DSLAM has received an IGMP Join packet.

If STB 1 does not receive the return notification packet when Timer 1 expires, STB1 resends the IGMP Join packet.

54: After receiving the IGMP Join packet from the DSLAM, the upper layer multicast router sends a multicast stream of multicast group 1 to the DSLAM; after receiving the multicast stream, the DSLAM multicasts the multicast stream to the port of User 1 (Supporting cross-VLAN/PVC multicast forwarding).

The multicast router may need to exchange multicast routing information with an upper layer device by means of the PIM/IGMP due to different network conditions and different user access conditions.

55: When User 2 also chooses to watch Channel 1, STB 2 sends an IGMP Join packet to join multicast group 1; after receiving the IGMP Join packet sent by STB2, the DSLAM records a source MAC address of STB2;

The DSLAM further needs to check whether the user has a right to join multicast group 1 or the physical port has enough bandwidth; if has enough bandwidth, proceed to 57; otherwise, proceed to 56.

56: The DSLAM constructs an abnormity notification packet according to the source MAC address of STB2, and sends the abnormity notification packet to STB2 in a unicast mode by taking the source MAC address of STB2 as a destination MAC address.

Alternatively, using IGMP multicast encapsulation, the DSLAM sends the abnormity notification packet to the corresponding user according to the port to which the IGMP Join packet connects.

If the user determines that the user has on right to watch a relevant multicast video service upon receiving the abnormity notification packet, the user does not send the IGMP Join packet to the network side any more, i.e. the procedure of joining a multicast group is terminated.

57: After receiving the IGMP Join packet, the DSLAM sends multicast stream 1 to the User 2 if it is determined that a member has joined multicast group 1.

58: When User 1 switches channels or stops watching the program on Channel 1, STB 1 sends an IGMP Leave packet to leave multicast group 1.

59: After receiving the IGMP Leave packet, the DSLAM sends a specific group query packet to determine whether there is another STB watching the program on Channel 1 via the port; if there is no another STB watching the program on Channel 1 via the port, the DSLAM stops sending multicast stream 1 to the port. If an IGMP Quick Leave is adopted, the DSLAM directly stops forwarding multicast stream 1 to the port instead of sending the specific group query packet.

As can be seen from the above procedure provided by the embodiment of the present invention, on the one hand, a return notification packet is sent to a user to notify the user that the network side has received the IGMP Join packet in the process of joining a multicast group by the user; on the other hand, an abnormity notification packet is sent to the user to notify the user of the reason for rejecting the user to join the multicast group when the network side rejects the user to join the multicast group. The return notification packet and the abnormity notification packet may be obtained by extending one type of packet, i.e., the return notification packet and the abnormity notification packet may be identified by means of different fields in one type of packet respectively. The return notification packet and the abnormity notification packet may also be obtained by extending two types of packets.

In addition, in accordance with an embodiment of the present invention, in the process of developing a multicast service by a user, in the case that the QoS of the multicast service provided for the user is impaired, i.e. the network side is unable to provide the multicast service desired by the user, the network side determines the reason for an abnormity of the multicast service, and notifies the user of the reason for the impairment of the QoS of the multicast service by means of an abnormity notification packet, so that the user may obtain the reason why it is unable to normally watch the multicast service.

In accordance with the embodiment of the present invention, the process of developing a multicast service involves a multicast service notification packet which may be a return notification packet or an abnormity notification packet. The multicast service notification packet is an extended and modified IGMP protocol packet. The multicast service notification packet may be only one type of packet extended or two types of packets extended.

In the case that two types of packets are used, the definition of IGMP is extended and two types of IGMP packets are added.

Figure 6:
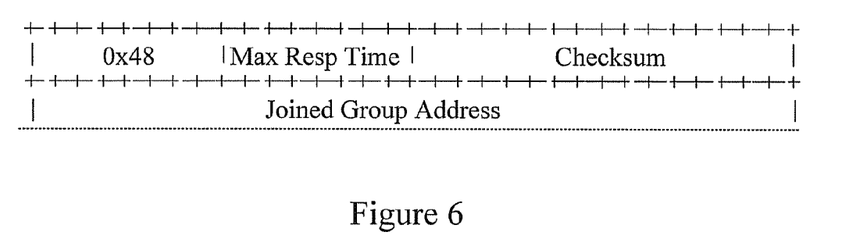
FIG. 6 is a schematic diagram illustrating the format of a return notification packet described in FIG. 5.

(1) The first type of IGMP packet includes: 0x46=Report Receipt, return notification packet, used as a confirmation packet upon receiving a 0x16 packet. The format of the return notification packet is as shown in FIG. 6. The return notification packet includes: packet type, i.e. 0x46, maximal response time, i.e., Max Resp Time, check value, i.e. Checksum and the number of the multicast group joined, i.e., Group Address.

(2) The second type of IGMP packet includes: 0x48 Report Inform, information packet, or referred to as abnormity notification packet used as an abnormity notification packet of handling result of 0x16 packet, for example used for notifying a user of a failure after the user fails to join a multicast group, and notifying the user of the reason for an abnormity when the abnormity occurs in the multicast service in the process of developing the multicast service by the user.

Figure 7:
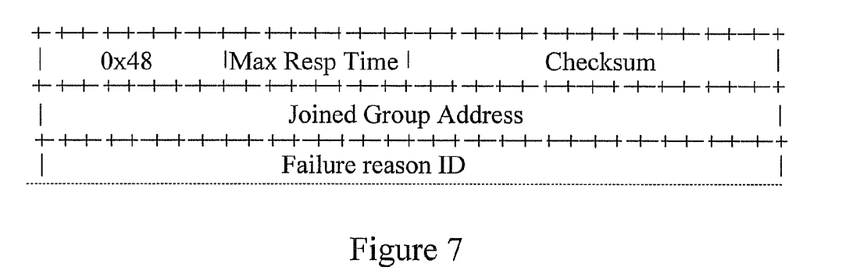
FIG. 7 is a schematic diagram illustrating the format of an abnormity notification packet described in FIG. 5.

The format of information packet is as shown in FIG. 7, including: packet type (0X48), the maximal response time, Check value, the number of the multicast group joined and the reason for a failure. The reason for a failure may be specifically indicated in a character string mode or by a reason ID.

In general, the reason ID indicating that a user fails to join a multicast group or an abnormity occurs in a multicast service may include:

0x0001, indicating that the backbone bandwidth is not enough;

0x0002, indicating that the line bandwidth is not enough;

0x0003, indicating that the line is deteriorated;

if the reason is indicated in a character string mode, a reason character string, for example, "Backbone bandwidth is not enough", may be set therein. Certainly, a new code corresponding to a new failure or an abnormality reason may be set in accordance with the failure type that the network side is able to determine.

In addition, a Layer 2 multicast packet is used in an existing protocol to transfer an IGMP packet, i.e. a Layer 2 destination MAC address is a multicast address; if a return notification packet and an abnormality notification packet extended in accordance with the embodiment of the present invention are still transferred by means of the multicast packet, all users of the multicast group have to receive the return notification packet and the abnormality notification packet instead of notifying users who need the return notification packet and the abnormality notification packet.

The following two methods are adopted in embodiments of the present invention.

Method 1: A destination MAC address of a return notification packet is modified into a unicast MAC address, that is, an source MAC address in an IGMP Join packet acts as the destination MAC address, and a return notification packet and an abnormality notification packet corresponding to the source MAC address will be forwarded to the designated user terminal, which makes it possible to only notify the designated user who needs to be notified; in this way, it is possible to save the bandwidth resources of network.

Method 2: A DSLAM device sends a return notification packet and an abnormality notification packet to the corresponding port of the user instead of sending to other ports in a multicast mode according to the port which the IGMP Join packet connects to or an abnormality occurs in, which enables the user to receive the traffic required by the user.

The present invention further includes: in the process of developing a multicast service by a user, if the QoS of a multicast video service is impaired, for example, a packet loss occurs due to bandwidth restriction, the network side may further construct an abnormality notification packet to notify the user terminal of the reason that the QoS of the multicast video service is impaired by means of the format as shown in FIG. 7, so that the user can obtain the reason that the QoS of the multicast video service is impaired in real time; in this way, it is not only possible to improve the user's satisfaction for a multicast service provided by an operator, but also convenient for the user to remove the reason that the QoS of the multicast video service is impaired in real time to improve the QoS of the multicast video service.

The method of the present invention may be implemented by means of an apparatus for improving the reliability of a multicast service; the apparatus may be set in a broadband access device, such as a DSLAM device, or be installed separately.

Figure 8:
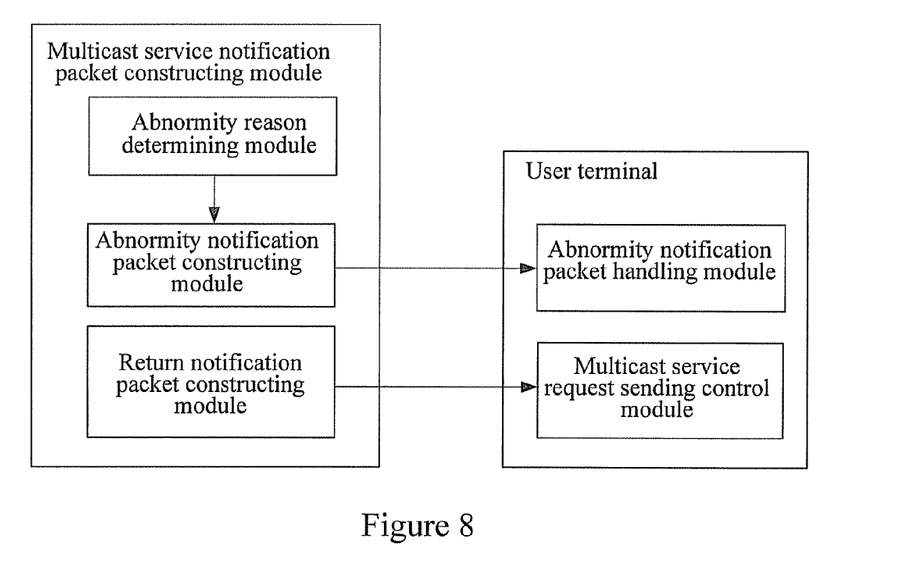
FIG. 8 is a schematic diagram illustrating the specific structure of an apparatus in accordance with another embodiment of the present invention.

The apparatus in accordance with an embodiment of the present invention is hereinafter described with respect to the attached drawings. As shown in FIG. 8, the apparatus in accordance with the embodiment of the present invention includes a multicast service notification packet constructing module capable of constructing a multicast service notification packet according to the condition when the user terminal requests developing a multicast service, and sending the multicast service notification packet to the user terminal; and the multicast service notification packet constructing module specifically includes:

an abnormality reason determining module capable of determining the reason for an abnormality when an abnormality occurs in a multicast service provided for the user, for example, a line is deteriorated and bandwidth is not enough;

an abnormality notification packet constructing module capable of constructing an abnormality notification packet according to the reason determined by the abnormality reason determining module, and sending the abnormality notification packet to the user terminal, so that the user can learn the reason for the abnormality in the multicast service according to the abnormality notification packet;

a return notification packet constructing module capable of constructing a return notification packet upon receiving a packet for joining the multicast group sent by the user terminal, and sending the return notification packet to the user terminal.

In an embodiment of the present invention, the apparatus may only include the return notification packet constructing module or only include the abnormality reason determining module and the abnormality notification packet constructing module.

The user terminal for implementing a multicast service in accordance with an embodiment of the present invention is as shown in FIG. 8, specifically including a multicast service request sending control module and an abnormality notification packet handling module.

The multicast service request sending control module is capable of controlling resending a multicast service request packet if receiving no response packet returned by the network side within a predetermined time period after the user terminal sends a multicast service request packet to the network side.

The abnormality notification packet handling module is capable of receiving an abnormality notification packet sent by the network side, and displaying a reason for abnormality contained in the abnormality notification packet on a display interface.

To sum up, in accordance with the embodiments of the present invention, the IGMP is extended for providing a return notification function and a notification function, thereby improving the stability of a multicast protocol and the operability of a multicast video network.

The foregoing is only preferred embodiments of the present invention. The protection scope of the present invention, however, is not limited to the above description. Any change or substitution, within the technical scope disclosed by the present invention, easily occurring to those skilled in the art should be covered by the protection scope of the present invention. Therefore, the protection scope of the present invention should be compatible with the protection scope stated by claims.

What is claimed is:

1. A method for implementing a multicast service, comprising:

receiving, by a digital subscriber line access multiplexer (DSLAM), a request for joining a multicast group from a user terminal;

recording, by the DSLAM, a port of the user terminal upon receiving the request for joining the multicast group sent by the user terminal;

determining, by the DSLAM, whether the user terminal is able to join the multicast group, and if so, permitting the user terminal to join the multicast group and providing, by the DSLAM, multicast service of the multicast group to the user terminal;

determining, by the DSLAM, whether quality of service (QoS) of the multicast service is impaired during the process of the multicast service being provided to the user terminal, and if so, determining, by the DSLAM, a reason that the QoS of the multicast service is impaired;

constructing, by the DSLAM, an abnormity notification packet carrying the reason that the QoS of the multicast is impaired; and sending, by the DSLAM, the abnormity notification packet to the user terminal via the recorded port;

upon determining that the user terminal is unable to be provided with multicast service of the multicast group, determining, by the DSLAM, a reason that the user terminal is unable to join the multicast group;

constructing, by the DSLAM, a return notification packet for responding to the request for joining the multicast group, the return notification packet carrying the reason that the user terminal is unable to join the multicast group; and sending, by the DSLAM, the return notification packet to the user terminal via the recorded port;

wherein the return notification packet and the abnormity notification packet are Internet Group Management Protocol (IGMP) packets with different formats.

2. The method of claim 1, wherein the reason that the user terminal is unable to join the multicast group is selected from the group consisting of:

a reason that the user terminal has no right to join the multicast group; and a reason that a physical port of the network side does not have enough bandwidth to provide the user terminal with the multicast service.

3. The method of claim 1, wherein the reason that QoS of the multicast service is impaired is indicated in the abnormity notification packet by a character string or a reason identifier (ID), the character string or the reason ID being selected from a group of character strings or reason IDs which are set in accordance with failure types.

4. The method of claim 3, wherein the reason that the QoS of the multicast service is impaired comprises one of that a backbone bandwidth is not enough, a line bandwidth is not enough, and a line is deteriorated.

5. The method of claim 1, wherein the return notification packet comprises a packet type field of 0x46 indicating that the return notification packet is a report receipt and the abnormity notification packet comprises a packet type field of 0x48 indicating that the abnormity notification packet is an information packet.

6. A method for implementing a multicast service, comprising:

receiving a request for joining a multicast group from a user terminal;

determining whether the user terminal is capable of joining the multicast group;

if the user terminal is capable of joining the multicast group, providing multicast service for the user terminal;

upon determining that a packet loss occurs due to bandwidth restriction in the multicast service provision process, constructing an abnormity notification packet carrying information indicating that a reason for quality of service (QoS) impairment of the multicast service is bandwidth restriction;

sending the abnormity notification packet to the user terminal, so as to notify the user terminal of the reason for the QoS impairment of the multicast service;

if the user terminal is incapable of joining the multicast group, sending a return notification packet for responding the packet for joining a multicast group, the return notification packet indicating a reason that the user terminal is unable to join the multicast group;

wherein the return notification packet and the abnormity notification packet are Internet Group Management Protocol (IGMP) packets with different formats.

7. The method of for implementing a multicast service of claim 6, further comprising:

extracting a source address from the packet for joining the multicast group.

8. The method for implementing a multicast service of claim 7, wherein the abnormity notification packet is a unicast packet, and the step of constructing an abnormity notification packet comprises:

modifying a destination address of the abnormity notification packet into the source address extracted from the received packet for joining the multicast group.

9. The method for implementing a multicast service of claim 6, further comprising:

recording a port receiving the packet for joining the multicast group, the port being configured at the access device and corresponding to the user terminal.

10. The method for implementing a multicast service of claim 9, wherein the abnormity notification packet is a multicast packet, and the abnormity notification packet is sent to the user terminal via the recorded port.

11. The method for implementing a multicast service of claim 6, wherein the method is implemented in a Digital Subscriber Line Access Multiplexer (DSLAM).

12. The method for implementing a multicast service of claim 6, wherein the reason for QoS impairment is carried in the abnormity notification packet by means of a character string or a reason ID, the character string or the reason ID being selected from a group of character strings or reason IDs which are set in accordance with failure types.

13. The method for implementing a multicast service of claim 12, wherein the reason that the QoS of the multicast service is impaired comprises one selected from a backbone bandwidth is not enough, a line bandwidth is not enough, and a line is deteriorated.

14. A Digital Subscriber Line Access Multiplexer (DSLAM), comprising:

a receiver, configured for receiving a request for joining a multicast group from a user terminal;

a return notification packet constructing module, configured for constructing, when it is determined that the user terminal is unable to join the multicast group, a return notification packet carrying a reason that the user terminal is unable to join the multicast group, and sending the return notification packet to the user terminal;

an abnormity reason determining module, configured for determining, when quality of service (QoS) of the multicast service is impaired during the multicast service being provided to the user terminal, a reason that the QoS of the multicast service is impaired;

an abnormity notification packet constructing module, configured for constructing an abnormity notification packet carrying the reason that the QoS of the multicast is impaired, and sending the abnormity notification packet to the user terminal;

wherein the return notification packet and the abnormity notification packet are Internet Group Management Protocol (IGMP) packets with different formats.

15. The DSLAM of claim 14, wherein the return notification packet comprises a packet type field of 0x46 indicating that the return notification packet is a report receipt and the abnormity notification packet comprises a packet type field of 0x48 indicating that the abnormity notification packet is an information packet.

16. The DSLAM of claim 14, wherein the reason that the user terminal is unable to join the multicast group comprises:
- a reason that the user terminal has no right to join the multicast group; or
- a reason that a physical port of a network side does not have enough bandwidth to provide the user terminal with the multicast service.

17. The DSLAM of claim 14, wherein the reason that QoS of the multicast service is impaired is indicated in the abnormity notification packet by a character string or a reason identifier (ID).

18. The DSLAM of claim 17, wherein the reason that the QoS of the multicast service is impaired comprises one of that a backbone bandwidth is not enough, a line bandwidth is not enough, and a line is deteriorated.

* * * * *